United States Patent
Hio et al.

(10) Patent No.: US 9,739,676 B2
(45) Date of Patent: Aug. 22, 2017

(54) PRESSURE DETECTING DEVICE

(71) Applicant: HITACHI AUTOMOTIVE SYSTEMS, LTD., Hitachinaka-shi, Ibaraki (JP)

(72) Inventors: Masayuki Hio, Hitachinaka (JP); Shinya Igarashi, Hitachinaka (JP); Shigenobu Komatsu, Tokyo (JP); Junji Onozuka, Hitachinaka (JP); Kentaro Miyajima, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 182 days.

(21) Appl. No.: 14/769,132

(22) PCT Filed: Jan. 29, 2014

(86) PCT No.: PCT/JP2014/051880
§ 371 (c)(1),
(2) Date: Aug. 20, 2015

(87) PCT Pub. No.: WO2014/132730
PCT Pub. Date: Sep. 4, 2014

(65) Prior Publication Data
US 2015/0377729 A1 Dec. 31, 2015

(30) Foreign Application Priority Data
Feb. 28, 2013 (JP) ................................. 2013-039060

(51) Int. Cl.
*G01L 9/00* (2006.01)
*G01L 19/00* (2006.01)
(Continued)

(52) U.S. Cl.
CPC .......... *G01L 9/0051* (2013.01); *G01L 9/0055* (2013.01); *G01L 13/025* (2013.01); (Continued)

(58) Field of Classification Search
USPC ........................................................ 73/726
See application file for complete search history.

(56) References Cited

U.S. PATENT DOCUMENTS 4,530,244 A 7/1985 Starr
5,877,423 A * 3/1999 Mattsson ................ G01L 9/065
338/42

(Continued)

FOREIGN PATENT DOCUMENTS

DE 32 07 833 A1 9/1983
JP 54-51489 A 4/1979
(Continued)

OTHER PUBLICATIONS

Partial European Search Report issued on Sep. 28, 2016: EP Application No. 14757030.3.

*Primary Examiner* — Clayton E Laballe
*Assistant Examiner* — Warren K Fenwick
(74) *Attorney, Agent, or Firm* — Volpe and Koenig, P.C.

(57) ABSTRACT

A pressure detecting device is mounted in a measurement target and instrument includes a strain inducer to which pressure of a pressure medium is applied and which generates strain in accordance with the pressure and a strain detecting element that is bonded onto a surface opposite to a pressure receiving surface of the strain inducer, in which the strain detecting element includes one or multiple central strain resistant bridges which are arranged at a central portion of the strain detecting element in a bonded surface direction, and one or multiple outer peripheral strain resistant bridges which are arranged at an outer periphery, and in which, for example, deformation of the strain detecting element caused by an external force when being screw-fixed to the measurement target instrument is obtained through the multiple strain resistant bridges. An error of detection pressure caused by the deformation in a pressure value detected through the central strain resistant bridge is corrected.

9 Claims, 10 Drawing Sheets

(51) Int. Cl.
*G01L 19/14* (2006.01)
*G01L 13/02* (2006.01)
*G01L 15/00* (2006.01)
*G01L 27/00* (2006.01)

(52) U.S. Cl.
CPC .......... *G01L 15/00* (2013.01); *G01L 19/0038* (2013.01); *G01L 19/14* (2013.01); *G01L 27/002* (2013.01); *G01L 27/007* (2013.01)

(56) References Cited

U.S. PATENT DOCUMENTS

| | | | |
|---|---|---|---|
| 6,422,088 | B1 | 7/2002 | Oba et al. |
| 7,748,276 | B2 * | 7/2010 | Kaneko ................. G01L 9/0051 73/720 |
| 2007/0228500 | A1 | 10/2007 | Shimazu et al. |
| 2009/0056462 | A1 | 3/2009 | Kaneko et al. |
| 2011/0259112 | A1 | 10/2011 | Shimazu et al. |
| 2013/0118268 | A1 | 5/2013 | Shimazu et al. |
| 2014/0042566 | A1 | 2/2014 | Ota et al. |

FOREIGN PATENT DOCUMENTS

| | | | |
|---|---|---|---|
| JP | 58-120142 | A | 7/1983 |
| JP | 03-37503 | A | 2/1991 |
| JP | 2001-272293 | A | 10/2001 |
| JP | 2001-324401 | A | 11/2001 |
| JP | 2007-263781 | A | 10/2007 |
| JP | 2009-063361 | A | 3/2009 |
| WO | 2012/144054 | A1 | 10/2012 |

\* cited by examiner

PRESSURE DETECTING DEVICE

TECHNICAL FIELD

The present invention relates to a pressure detecting device which is mounted in various instruments of measurement targets and detects pressure.

BACKGROUND ART

In the related art, a pressure detecting device disclosed in PTL 1 has been proposed. For example, the pressure detecting device includes a strain inducer which causes strain when pressure of a pressure medium is received, and a strain detecting element which detects strain caused in the strain inducer.

CITATION LIST

Patent Literature

PTL 1: JP-A-3-37503

SUMMARY OF INVENTION

Technical Problem

In a pressure detecting device disclosed in PTL 1, a detection signal of at least any one of a detection portion which is configured to be at a position where an amount of strain caused by deformation is the maximum and another detection portion which is configured to be at a position where the amount of strain is less than the maximum by a predetermined amount is directly taken and utilized as a measurement value.

Therefore, a component of an external force other than pressure to be measured is also included in the measurement value, thereby resulting in unfavorable detection accuracy and low reliability.

The present invention has been made in order to solve the above-described problem. An object thereof is to provide a highly accurate pressure detecting device which is not affected by a component of an external force.

Solution to Problem

In order to solve the above-described problem, for example, a configuration described in claims is employed. The present invention includes plural means for solving the above-described problem. As an example thereof, there is provided a pressure detecting device which is mounted in a measurement target instrument, the device including: a strain inducer to which pressure of a pressure medium is applied and which generates strain in accordance with the pressure; and a strain detecting element that is bonded onto a surface opposite to a pressure receiving surface of the strain inducer, in which the strain detecting element includes one or multiple central strain resistant bridges which are arranged at a central portion of the strain detecting element in a bonded surface direction, and one or multiple outer peripheral strain resistant bridges which are arranged at an outer periphery of the central strain resistant bridge, and in which deformation of the strain detecting element caused by an external force when being mounted in the measurement target instrument is obtained through the multiple strain resistant bridges, an error of detection pressure caused by the obtained deformation in a pressure value detected through the central strain resistant bridge is corrected, and the corrected pressure value is referred to as a detection value of the pressure detecting device.

Advantageous Effects of Invention

According to the present invention, since an error of detection pressure caused by a component of an external force is corrected, it is possible to acquire a pressure detecting device having high detection accuracy. Further configurations and effects will be clearly described through the following embodiments.

BRIEF DESCRIPTION OF DRAWINGS

FIG. 4(a) is a plan view of a strain detecting element, and FIG. 4(b) is a side view of a main portion.

FIG. 5(a) is a plan view of the strain detecting element, and FIG. 5(b) is a side view of the main portion.

FIG. 8(a) is a plan view of the strain detecting element, and FIG. 8(b) is a characteristic diagram illustrating a relationship between a position of a strain resistant bridge and an output therefrom.

FIG. 9(a) is a side view of the main portion, FIG. 9(b) is a plan view of the strain detecting element, and FIG. 9(c) is a characteristic diagram illustrating a relationship between pressure and an output of the strain resistant bridge.

FIG. 11(a) is a plan view of the strain detecting element, and FIG. 11(b) is a characteristic diagram illustrating a relationship between a position of the strain resistant bridge and an output therefrom.

DESCRIPTION OF EMBODIMENTS

Hereinafter, an embodiment of the present invention will be described with reference to the drawings. However, the present invention is not limited to examples of the embodiment. First, descriptions will be given with reference to FIGS. 1 and 2 regarding an example of a pressure measurement device to which the present invention is applied.

The pressure measurement device of the present embodiment is configured to be a high pressure sensor which is installed in a vehicle, for example. The pressure measurement device is used for measuring fuel pressure of an engine, oil pressure of a brake, various types of gas pressure, and the like.

Figure 1:
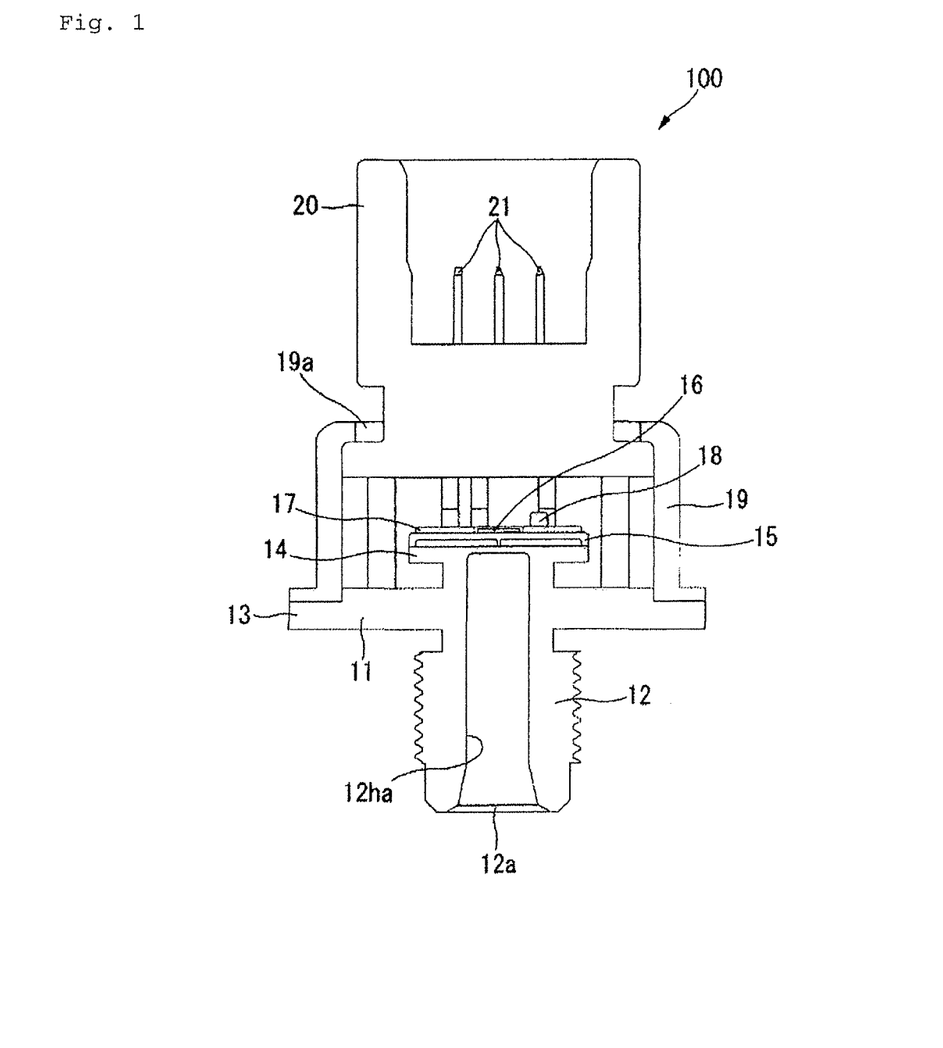
FIG. 1 is a cross-sectional configuration diagram illustrating an example of a pressure measurement device to which the present invention is applied.

In a pressure measurement device 100 in FIG. 1, the reference numeral 11 indicates a pressure port through which pressure is introduced. The pressure port 11 includes a hollow tubular pressure introduction portion 12 in which a pressure introduction port 12a is formed at one end in an axial direction, a cylindrical flange 13 which is formed at the other end (an upper portion) of the pressure introduction portion 12 in the axial direction, for example, and a base 14 which stands in a central site of the flange 13.

A pressure introduction hole 12ha of the pressure introduction portion 12 is bored continuously to a site at a height slightly lower than a center portion of the flange 13 and an upper surface of the base 14.

A strain inducer 15 which is deformed due to pressure introduced through the pressure introduction hole 12ha and generates strain is arranged on the upper surface of the base 14. A strain detecting element 16 including multiple strain resistant bridges which output an electrical signal in response to deformation (strain) of the strain inducer 15 is bonded onto a surface opposite to a pressure receiving surface (a surface on the base 14 side) of the strain inducer 15.

The strain detecting element 16 is configured to be a semiconductor chip which is obtained by providing the multiple strain resistant bridges on one chip.

The reference numeral 17 indicates a substrate provided on the base 14. In the substrate 17, an amplifier which amplifies each of detection signals output from the strain detecting element 16, an A-D converter which converts an analog output signal of the amplifier into a digital signal, a digital signal calculation processing circuit which performs below-described correction calculation based on the digital signal, a memory and a capacitor 18 in which various types of data are stored, and the like are installed.

On an upper surface of an outer periphery of the flange 13, the base 14, the strain inducer 15, the strain detecting element 16, the substrate 17, and a peripheral edge portion at one open end of a cover 19 in the axial direction covering the capacitor 18 are fixed thereto.

In a blocking plate 19a which blocks the other end of the cover 19 in the axial direction, a predetermined range in diameter from the center is notched. For example, a connector 20 which is formed of a resin and is used for outputting a detection pressure value detected by the pressure measurement device 100 to the outside is inserted into the notch portion.

One end of the connector 20 is fixed to the cover 19 inside the cover 19, and the other end of the connector 20 is exposed outward from the cover 19.

For example, rod-like terminals 21 inserted by performing insert molding is included in the connector 20. The terminals 21 are configured to be three, for example, a power source terminal, an earth terminal, and a signal output terminal. One end of each terminal 21 is connected to the substrate 17, and the other end thereof is connected to an external connector (not illustrated), thereby being electrically connected to an ECU and the like of a vehicle through a wiring member.

Figure 2:
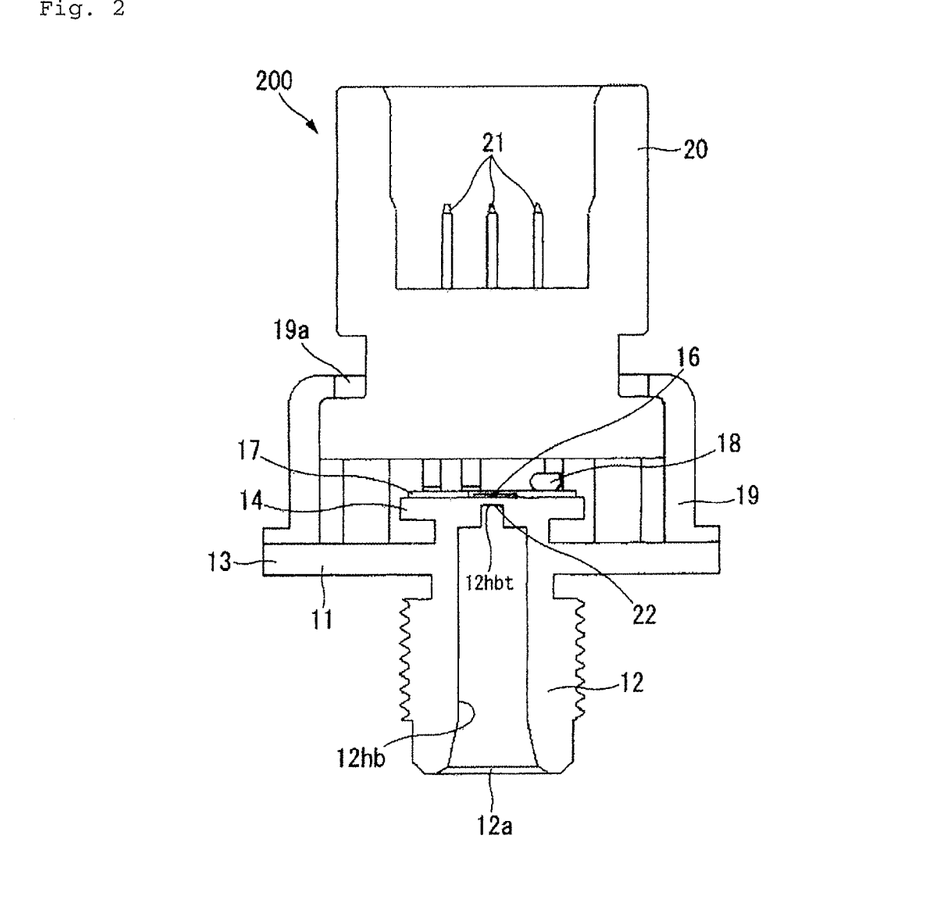
FIG. 2 is a cross-sectional configuration diagram illustrating another example of the pressure measurement device to which the present invention is applied.

In addition, the pressure measurement device in FIG. 2 shows an example of a device including the pressure receiving surface of the strain inducer onto which the strain detecting element 16 is bonded, formed as a rectangular diaphragm. In FIG. 2, portions same as those in FIG. 1 are illustrated with the same reference numerals and signs. In a pressure measurement device 200 in FIG. 2, the strain inducer provided with the strain detecting element 16 is configured to be different from the configuration in FIG. 1.

In other words, a distal end portion 12hbt of a pressure introduction hole 12hb of the pressure introduction portion 12 facing the strain detecting element 16 on the base 14 side is formed identically with the shape of the surface of the rectangular diaphragm, and the strain detecting element 16 is arranged on the top surface of the base 14 facing the distal end portion 12hbt.

Therefore, a site of the base 14 in FIG. 2 between the distal end portion 12hbt and the strain detecting element 16 is formed as the rectangular diaphragm (the strain inducer), and a surface of the rectangular diaphragm on the distal end portion 12hbt side becomes a pressure receiving surface 22. Other portions in FIG. 2 are configured similarly to those in FIG. 1.

Figure 3:
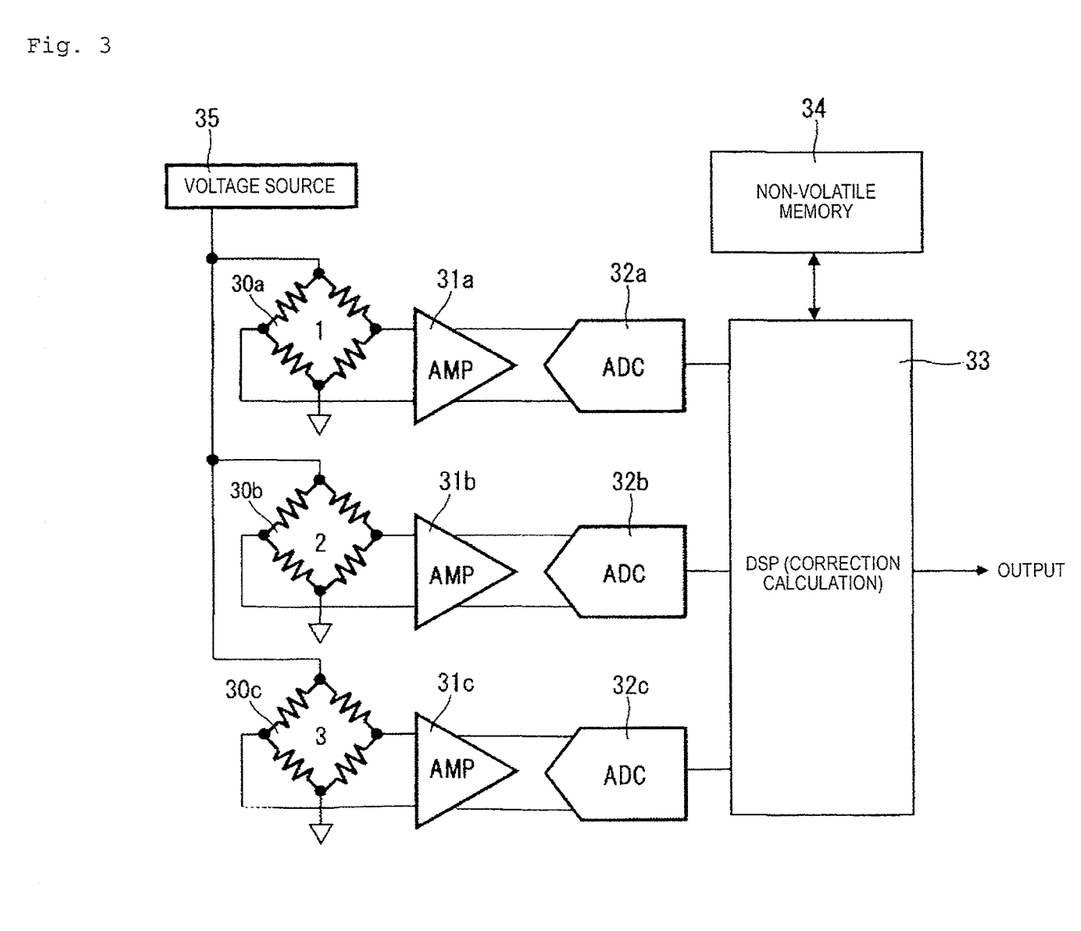
FIG. 3 is a circuit diagram of a pressure detecting device according to an embodiment of Example of the present invention.

Subsequently, a circuit configuration of the multiple strain resistant bridges of the strain detecting element 16 and each of circuit components installed in the substrate 17 will be described with reference to FIG. 3. In FIG. 3, the reference numerals and signs 30a to 30c illustrate the multiple strain resistant bridges of the strain detecting element 16. The strain resistant bridges are configured to be in bridge connection with a resistance gauge of which the resistance value varies by being strained in accordance with deformation of the strain inducer 15 (a diaphragm).

Output signals (bridge signals corresponding to pressure) of strain resistant bridges 30a to 30c are amplified by amplifiers 31a to 31c, and the amplified output signals are converted into digital signals by A-D (analog-digital) converters 32a to 32c.

The reference numeral 33 indicates a digital signal calculation processing circuit which performs calculation processing for correcting a pressure value detected by one strain resistant bridge 30a with reference to a detection pressure value of the remaining strain resistant bridges 30b and 30c, for example, and outputs the corrected pressure value as a detection value of a pressure detecting device, based on an output signal of the A-D converters 32a to 32c.

Without being limited to correction of calculation processing, the digital signal calculation processing circuit 33 performs a comparison between the detection pressure values of the multiple strain resistant bridges or a comparison between the detection pressure value of the strain resistant bridge and a specified pressure value which is stored in a non-volatile memory 34 in advance. Then, the digital signal calculation processing circuit 33 determines deterioration of a measurement target instrument and deterioration of the strain detecting element 16 and performs processing such as outputting of a fault signal at the time of determination of deterioration.

Supply of electricity from a voltage source 35 to the strain resistant bridges 30a to 30c and an output of each signal from the digital signal calculation processing circuit 33 are performed through the terminal 21 illustrated in FIGS. 1 and 2.

The non-volatile memory 34 may be installed in a circuit chip different from that of other circuit components. In addition, the number of the strain resistant bridges to be installed is not limited to three as illustrated in FIG. 3 as long as multiple strain resistant bridges are provided. Moreover, it may be configured that correction calculation is performed in an analog circuit in place of the digital signal calculation processing circuit 33.

Example 1

In FIGS. 4 to 11 illustrating Examples 1 to 7 described below, the strain detecting element 16 detects strain deformed in response to pressure introduced from the pressure introduction portion 12 as well as pressure. The same portions as those in FIGS. 1 and 2 are illustrated with the same reference numerals and signs.

Figure 4:
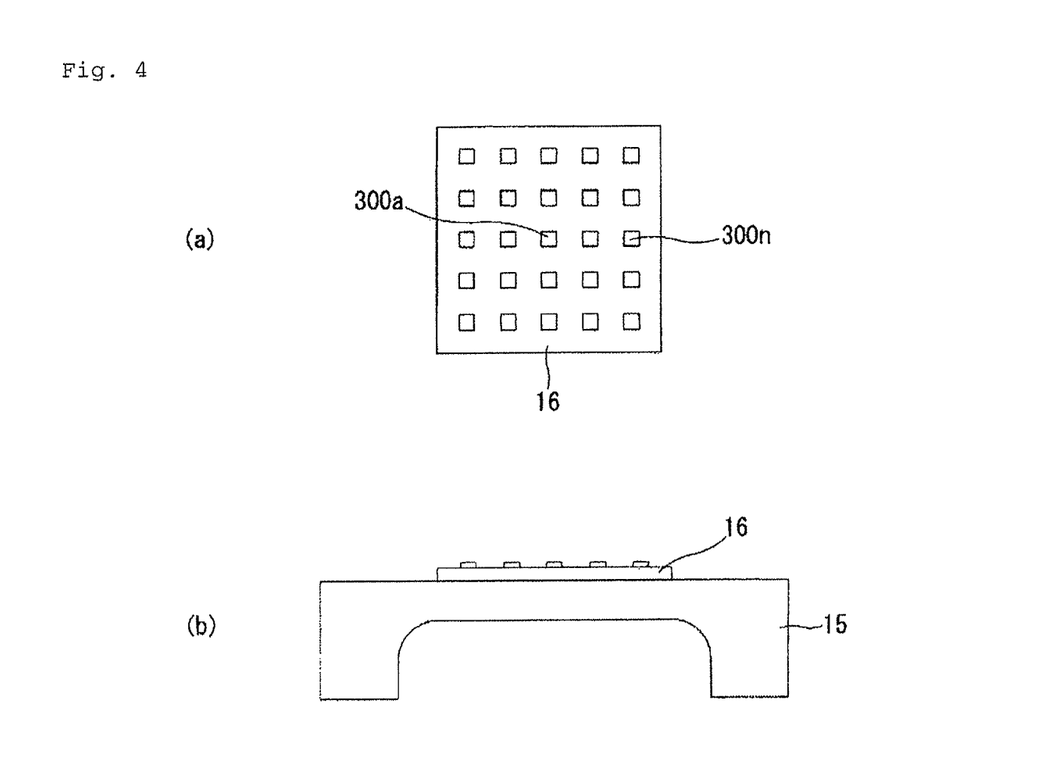
FIG. 4 is a diagram illustrating Example 1 of the present invention.

FIG. 4 illustrates the strain detecting element 16 of the present Example 1. For example, twenty five strain resistant bridges 300 are arranged in the strain detecting element 16 at equal intervals vertically and horizontally. In the present Example 1, the strain resistant bridge arranged at a substantially central portion of the strain detecting element 16 is referred to as a central strain resistant bridge 300a, and the strain resistant bridges arranged on the outer peripheral side are referred to as outer peripheral strain resistant bridges 300b to 300n. The central strain resistant bridge 300a is not limited to being one and may be provided in multiple numbers.

Then, with reference to a pressure value detected by the outer peripheral strain resistant bridges 300b to 300n, a pressure value detected by the central strain resistant bridge 300a is corrected (by the digital signal calculation processing circuit 33 in FIG. 3), and the corrected pressure value is output as a detection pressure value of the pressure detecting device.

According to the above-described configuration, for example, an external force occurring when being fixed (screwed, or the like) while the strain detecting element 16 is mounted in the measurement target instrument (bonded to the strain inducer 15) is applied onto the outer peripheral side. Therefore, deformation of the strain detecting element 16 caused by the external force is detected by the outer peripheral strain resistant bridges 300b to 300a.

Therefore, an error caused by the external force can be cancelled by correcting the detected output of the central strain resistant bridge 300a with reference to the detected output of the outer peripheral strain resistant bridges 300b to 300n. Accordingly, detection accuracy of the pressure detecting device can be enhanced.

Example 2

Figure 5:
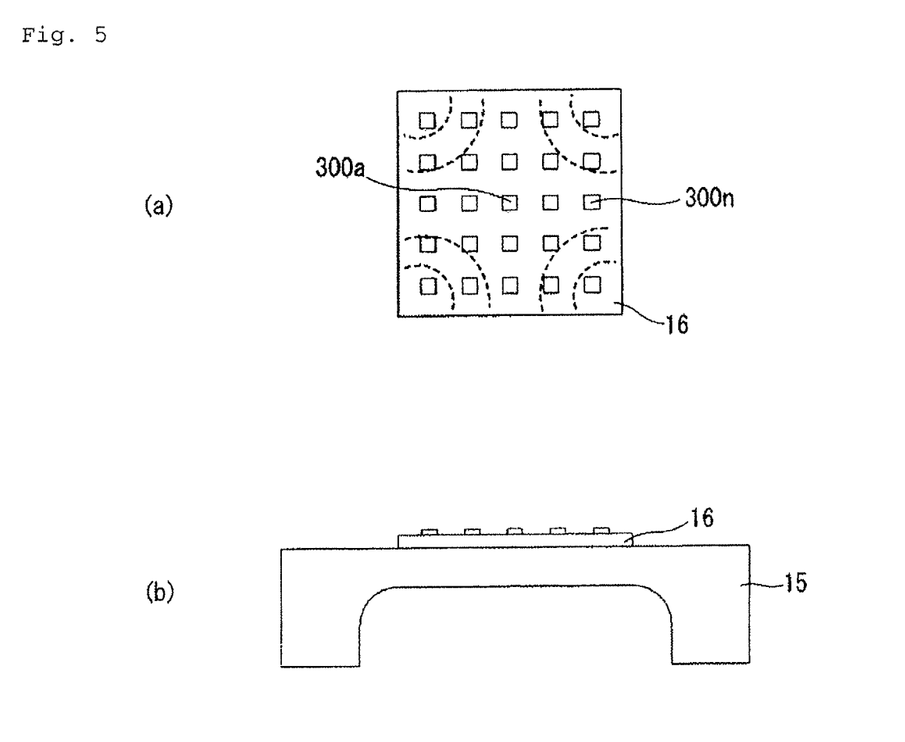
FIG. 5 is a diagram illustrating Example 2 of the present invention.

FIG. 5 illustrates the configuration of the present Example 2. The configuration of the strain detecting element 16 is the same as that in FIG. 4. In the present Example 2, a detection pressure value of the central strain resistant bridge 300a is output as a detection pressure value of the device. Meanwhile, detected strain of the outer peripheral strain resistant bridges 300b to 300n is compared to set strain values of the outer peripheral strain resistant bridges 300b to 300n which are stored in the non-volatile memory 34 in advance. Then, temporal degradation of the measurement target instrument is determined based on deviation thereof, and a fault signal is output (output from the digital signal calculation processing circuit 33 as illustrated in FIG. 3) at the time of determination of temporal degradation.

In addition, in this case, for example, a fault signal is output before the above-described detection strain value becomes a remarkably significant value or a remarkably small value due to the above-described temporal degradation.

Generally, temporal degradation of the measurement target instrument, for example, a creep, progresses from the ends of the chip (the end portions of the strain detecting element 16) toward the center as indicated by the dotted lines in FIG. 5 (a). Therefore, a creep can be detected in an early stage and temporal degradation can be determined by detecting strain through the outer peripheral strain resistant bridges 300b to 300n as described in the present Example 2.

The central strain resistant bridge 300a is not limited to being one and may be provided in multiple numbers.

Example 3

Figure 6:
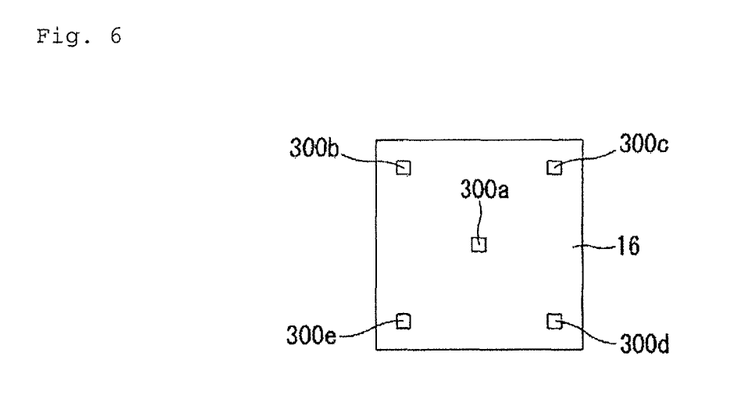
FIG. 6 is a plan view of the strain detecting element in Example 3 of the present invention.

FIG. 6 illustrates the configuration of the present Example 3. The central strain resistant bridge 300a is provided in a substantially central portion in the strain detecting element 16. Outer peripheral strain resistant bridges 300b to 300e are provided on each of four corners (corners of the chip) of the strain detecting element 16.

In the present Example 3, a detection pressure value of the central strain resistant bridge 300a is output as a detection pressure value of the device. Meanwhile, detected strain of the outer peripheral strain resistant bridges 300b to 300e is compared to the set strain values of the outer peripheral strain resistant bridges 300b to 300e which are stored in the non-volatile memory 34 in advance. Then, temporal degradation of the measurement target instrument and the strain detecting element 16 is determined based on deviation thereof, and a fault signal is output (output from the digital signal calculation processing circuit 33 as illustrated in FIG. 3) at the time of determination of temporal degradation.

In addition, in this case, for example, a fault signal is output before the above-described detection strain value becomes a remarkably significant value or a remarkably small value due to the above-described temporal degradation.

Generally, a crack is likely to occur on the corners of a chip (four corners of the strain detecting element 16). Therefore, a crack can be detected in an early stage and temporal degradation can be determined by detecting strain through the outer peripheral strain resistant bridges 300b to 300e as described in the present Example 3. The central strain resistant bridge 300a is not limited to being one and may be provided in multiple numbers.

Example 4

Figure 7:
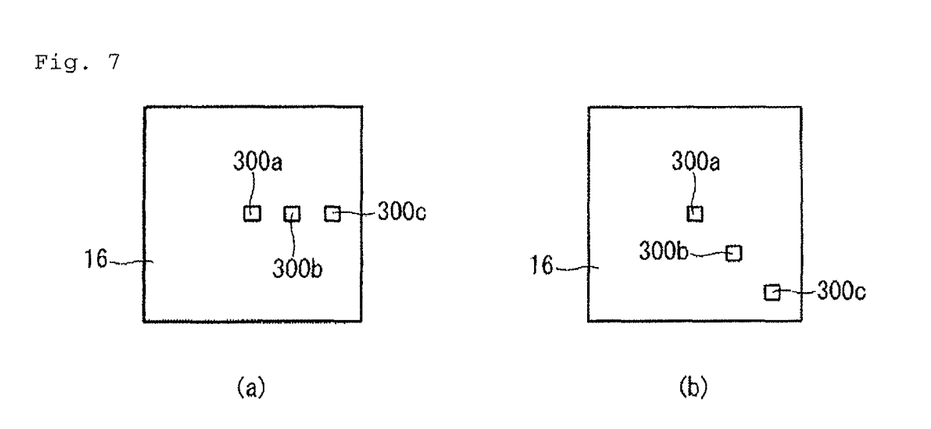
FIG. 7 is a plan view of the strain detecting element in Example 4 of the present invention.

FIG. 7 illustrates the configuration of the present Example 4. In the strain detecting element 16, the central strain resistant bridge 300a is provided at a substantially central portion, and the outer peripheral strain resistant bridges 300b and 300c are linearly provided at predetermined intervals from the central strain resistant bridges 300a in an outer circumferential direction.

In the present Example 4, a detection pressure value of the central strain resistant bridge 300a is output as a detection pressure value of the device. Meanwhile, detected strain of the outer peripheral strain resistant bridges 300b and 300c is compared to the set strain values of the outer peripheral strain resistant bridges 300b and 300c which are stored in the non-volatile memory 34 in advance. Then, temporal degradation of the measurement target instrument is determined based on deviation thereof, and a fault signal is output (output from the digital signal calculation processing circuit 33 as illustrated in FIG. 3) at the time of determination of temporal degradation.

In addition, in this case, for example, a fault signal is output before the above-described detection strain value becomes a remarkably significant value or a remarkably small value due to the above-described temporal degradation.

Generally, temporal degradation of the measurement target instrument, for example, a creep, progresses toward the center in the outer circumferential direction. Therefore, a creep can be detected in an early stage and temporal degradation can be determined by detecting strain through the outer peripheral strain resistant bridges 300b and 300c as described in the present Example 4. The central strain resistant bridge 300a is not limited to being one and may be provided in multiple numbers.

Example 5

Figure 8:
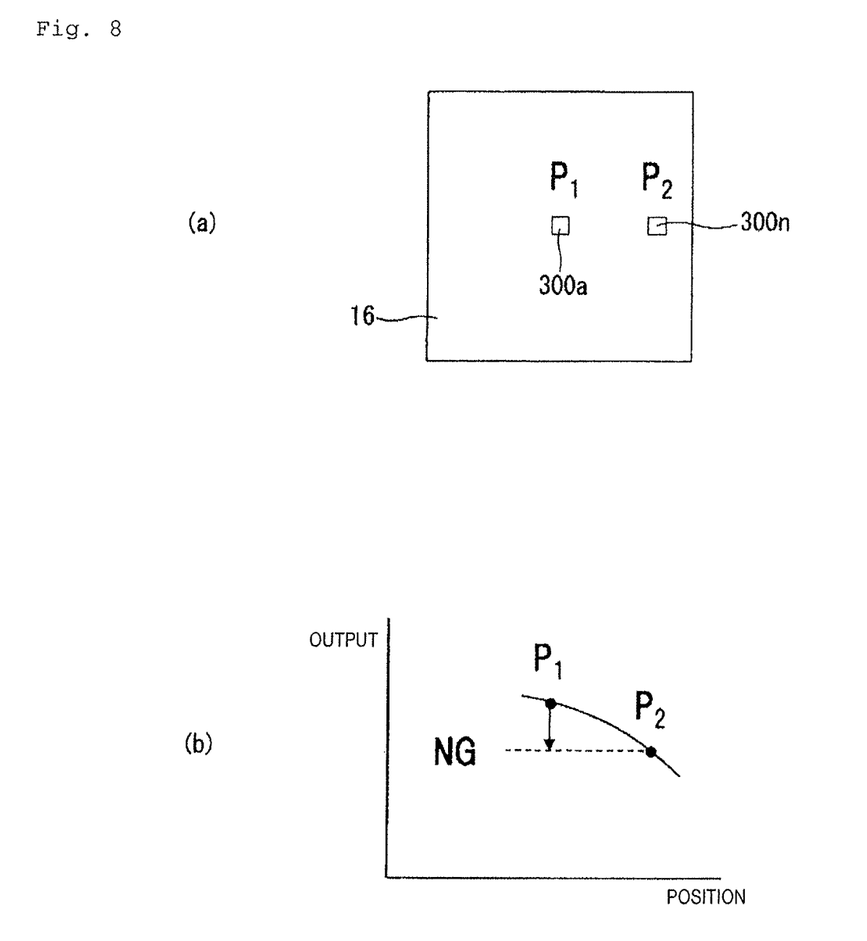
FIG. 8 is a diagram illustrating Example 5 of the present invention.

FIG. 8 illustrates the configuration of the present Example 5. In the strain detecting element 16, the central strain resistant bridge 300a ($P_1$) is provided at a substantially central portion, and the outer peripheral strain resistant bridge 300n ($P_2$) is provided on the outer peripheral side.

In the configuration in FIG. 8, during pressure detection, a fault signal is output when a detection pressure value ($P_1$) of the central strain resistant bridge 300a becomes smaller than a detection pressure value ($P_2$) of the outer peripheral strain resistant bridge 300n. Since the detection pressure value ($P_1$) of the central strain resistant bridge 300a is supposed to be greater than the detection pressure value ($P_2$) of the outer peripheral strain resistant bridge 300n during pressure detection, it is possible to determine that a fault has occurred in a case of $P_1<P_2$.

Example 6

Figure 9:
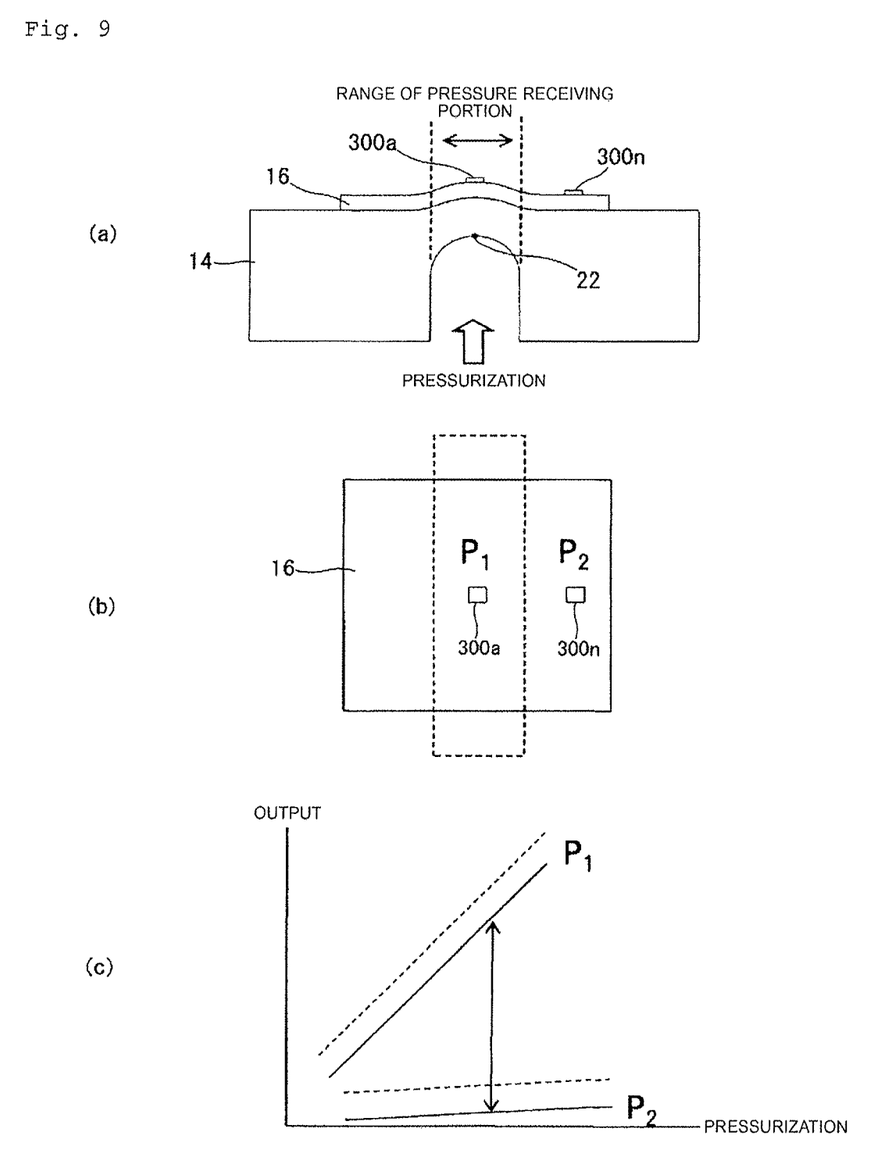
FIG. 9 is a diagram illustrating Example 6 of the present invention.

FIG. 9 illustrates a configuration of Example 6 in which the present invention is applied to a device including the pressure receiving surface (22) that has the same shape as the rectangular diaphragm illustrated in FIG. 2. In FIG. 9, in the strain detecting element 16, the central strain resistant bridge 300a ($P_1$) is provided at a substantially central portion within a range of the pressure receiving portion, and the outer peripheral strain resistant bridge 300n ($P_2$) is provided on the outer peripheral side.

In the above-described configuration, first, an external force occurring when the strain detecting element 16 is mounted in the base 14 including the rectangular diaphragm illustrated in FIG. 2 and is screwed so as to be fixed thereto is applied to the arrangement site of the outer peripheral strain resistant bridge 300n ($P_2$), and then, the external force is also applied to the arrangement site of the central strain resistant bridge 300a ($P_1$). Therefore, strain (pressure) by an external force while being screwed is detected by both the strain resistant bridges 300a and 300n.

Subsequently, in the central strain resistant bridge 300a which is provided within the range of the pressure receiving portion indicated by the dotted line in FIG. 9(b), detection pressure becomes significant when pressure is introduced into the pressure introduction hole 12hb illustrated in FIG. 2 and the pressure receiving surface 22 is pressurized. In contrast, a detection pressure value of the outer peripheral strain resistant bridge 300n provided in the outer periphery beyond the range of the pressure receiving portion at the time of pressurization is extremely small compared to a detection pressure value of the central strain resistant bridges 300a.

Therefore, FIG. 9(c) illustrates relationships between a pressurization state while performing screw-fixing and receiving pressure by introducing pressure, and each of outputs of the central strain resistant bridge 300a and the outer peripheral strain resistant bridge 300n. In FIG. 9(c), the detection pressure value $P_1$ of the central strain resistant bridge 300a includes both detection pressure caused by an external force at the time of performing screw-fixing and detection pressure at the time of receiving pressure, whereas the detection pressure value $P_2$ of the outer peripheral strain resistant bridge 300n is taken mostly by detection pressure caused by an external force at the time of screw fixing.

Therefore, by obtaining a difference ($P_1-P_2$) between the detection pressure value $P_1$ of the central strain resistant bridge 300a and the detection pressure value $P_2$ of the outer peripheral strain resistant bridge 300n, detection pressure caused by an external force at the time of performing screw fixing is mostly cancelled, and thus, it is possible to output detection pressure only substantially at the time of receiving pressure. Accordingly, an error of detection pressure caused by an external force at the time of screw-fixing is corrected, and thus, detection accuracy can be enhanced.

In addition, correlation of the detection pressure values $P_1$ and $P_2$ of the central strain resistant bridge 300a and the outer peripheral strain resistant bridge 300n and the difference therebetween is stored in advance in the non-volatile memory 34 illustrated in FIG. 3, and a fault signal is output when the correlation exceeds a specified value so as to be deviated therefrom. Then, the detection pressure value $P_1$ of the central strain resistant bridge 300a of which the pressure value is relatively significant and which is provided within the range of the pressure receiving portion is referred to as a detection pressure value of the device.

Figure 10:
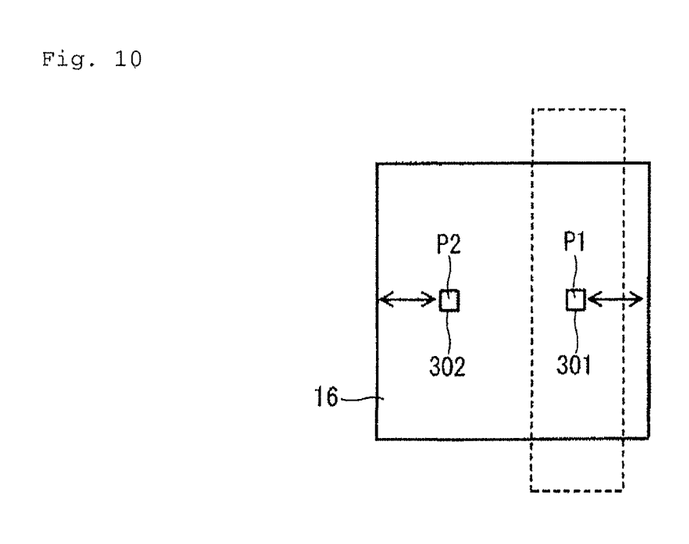
FIG. 10 is a plan view of the strain detecting element illustrating a modification example of Example 6 of the present invention.

FIG. 10 is a plan view of the strain detecting element 16 illustrating another embodiment of Example 6. In FIG. 10, an arrangement distance to the peripheral edge portion of the strain detecting element 16 nearest to a first strain resistant bridge 301 ($P_1$) from the strain resistant bridge 301 provided within the range of the pressure receiving portion indicated by the dotted line is set so as to be equivalent to an arrangement distance to the peripheral edge portion of the strain detecting element 16 nearest to a second strain resistant bridge 302 ($P_2$) from the strain resistant bridge 302 provided beyond the region of the pressure receiving portion.

According to such a configuration, an external force at the time of screw-fixing is transmitted inward in an approximately equivalent manner from the outer peripheral side of the strain detecting element 16. Therefore, the detection pressure values of the first strain resistant bridge 301 and the second strain resistant bridge 302 caused by external forces become equal to each other. Then, by eliminating the difference between the detection pressure values $P_1$ and $P_2$, the component caused by an external force is completely cancelled, and thus, detection accuracy is enhanced further.

Example 7

Figure 11:
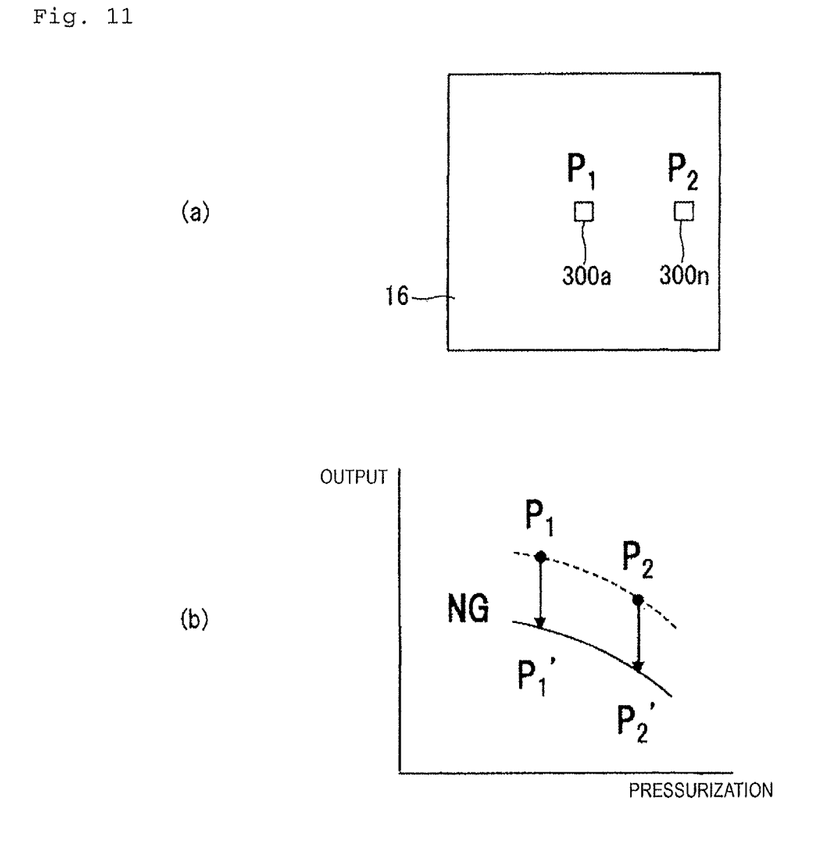
FIG. 11 is a diagram illustrating Example 7 of the present invention.

In the present Example 7, as illustrated in FIG. 11, when there are abnormal variations, for example, drastic drops in both the detection pressure values of the strain resistant bridges 300a and 300n provided in the strain detecting element 16 on the center and the outer peripheral side as illustrated in FIG. 11 (b) ($P_1$ and $P_2 \rightarrow P_1'$ and $P_2'$), the detection pressure value $P_1'$ on the central strain resistant bridge 300a side provided within the range of the pressure receiving portion is employed as a pressure detection value of the device.

This is because the central strain resistant bridge 300a of which the pressure value is relatively significant and which is provided within the range of the pressure receiving portion exhibits higher reliability.

Therefore, according to Example 7, the pressure detecting device becomes highly reliable.

REFERENCE SIGNS LIST

11 . . . pressure port
12 . . . pressure introduction portion

12a . . . pressure introduction port
12ha, 12hb . . . pressure introduction hole
12hbt . . . distal end portion
13 . . . flange
14 . . . base
15 . . . strain inducer
16 . . . strain detecting element
17 . . . substrate
18 . . . capacitor
19 . . . cover
19a . . . blocking plate
20 . . . connector
21 . . . terminal
22 . . . pressure receiving surface
30a to 30c, 300a to 300n, 301, 302 . . . strain resistant bridge
31a to 31c . . . amplifier
32a to 32c . . . A-D converter
33 . . . digital signal calculation processing circuit
34 . . . non-volatile memory
35 . . . voltage source
100, 200 . . . pressure measurement device

The invention claimed is:

1. A pressure detecting device which is mounted in a measurement target instrument, the device comprising:
a strain inducer to which pressure of a pressure medium is applied and which generates strain in accordance with the pressure; and
a strain detecting element that is bonded onto a surface opposite to a pressure receiving surface of the strain inducer,
wherein the strain detecting element includes one or multiple central strain resistant bridges which are arranged at a central portion of the strain detecting element in a bonded surface direction, and one or multiple outer peripheral strain resistant bridges which are arranged at an outer periphery of the central strain resistant bridge, and
wherein deformation of the strain detecting element caused by an external force when being mounted in the measurement target instrument is obtained through the multiple strain resistant bridges, an error of detection pressure caused by the obtained deformation in a pressure value detected through the central strain resistant bridge is corrected, and the corrected pressure value is referred to as a detection value of the pressure detecting device.

2. The pressure detecting device according to claim 1,
wherein temporal degradation of the measurement target instrument is determined based on detected strain of the outer peripheral strain resistant bridge, and a fault signal is output at the time of determination of temporal degradation.

3. The pressure detecting device according to claim 2,
wherein the outer peripheral strain resistant bridge includes the strain resistant bridges which are arranged on four corners of the strain detecting element, and temporal degradation of the measurement target instrument and deterioration and damage of the strain detecting element are determined based on the detected strain of the strain resistant bridges on the four corners.

4. The pressure detecting device according to claim 2,
wherein the outer peripheral strain resistant bridge includes the multiple strain resistant bridges which are linearly arranged in the strain detecting element in an outer circumferential direction and determine temporal degradation progressing from the outer circumferential direction.

5. The pressure detecting device according to claim 1,
wherein the central strain resistant bridge is arranged at a position corresponding to a site in the strain detecting element receiving first pressure which is applied from the pressure medium,
wherein the outer peripheral strain resistant bridge is arranged at a position corresponding to a site in the strain detecting element receiving second pressure which is lower than the first pressure, and
wherein the fault signal is output when a detection pressure value of the central strain resistant bridge becomes smaller than a detection pressure value of the outer peripheral strain resistant bridge.

6. The pressure detecting device according to claim 1,
wherein the central strain resistant bridge is arranged at a substantially central portion of the strain detecting element.

7. A pressure detecting device which is mounted in a measurement target instrument, the device comprising:
a strain inducer to which pressure of a pressure medium is applied and which generates strain in accordance with the pressure; and
a strain detecting element that is bonded onto a surface opposite to a pressure receiving surface of the strain inducer,
wherein the strain detecting element includes one or multiple first strain resistant bridges which are arranged at positions corresponding to sites receiving a first pressure applied from the pressure medium, and one or multiple second strain resistant bridges which are arranged at positions corresponding to sites receiving a second pressure which is lower than the first pressure, and
wherein a difference between a detection pressure value of the first strain resistant bridges and a detection pressure value of the second strain resistant bridges is referred to as a detection pressure value of the pressure detecting device.

8. The pressure detecting device according to claim 7,
wherein correlation of each detection pressure value of the first strain resistant bridge and the second strain resistant bridge and the difference therebetween is stored in advance, a fault signal is output when the correlation exceeds a specified value so as to be deviated therefrom, and the detection pressure value of the first strain resistant bridge is referred to as the detection pressure value of the pressure detecting device.

9. The pressure detecting device according to claim 7,
wherein an arrangement distance of the first strain resistant bridge to a peripheral edge portion of the strain detecting element nearest to the first strain resistant bridge is set so as to be equivalent to an arrangement distance of the second strain resistant bridge to a peripheral edge portion of the strain detecting element nearest to the second strain resistant bridge.

* * * * *